United States Patent
Huang et al.

(10) Patent No.: US 9,250,935 B2
(45) Date of Patent: Feb. 2, 2016

(54) SYSTEMS AND METHODS FOR LOOP SUSPENSION IN JAVA PROGRAMMING

(71) Applicant: Marvell World Trade Ltd., St. Michael (BB)

(72) Inventors: Haitao Huang, Shanghai (CN); Liping Gao, Shanghai (CN); Xinyu Qi, Shanghai (CN); Ningsheng Jian, Shanghai (CN)

(73) Assignee: MARVELL WORLD TRADE LTD., St. Michael (BB)

( * ) Notice: Subject to any disclaimer, the term of this patent is extended or adjusted under 35 U.S.C. 154(b) by 0 days.

(21) Appl. No.: 14/533,540

(22) Filed: Nov. 5, 2014

(65) Prior Publication Data

US 2015/0149986 A1  May 28, 2015

Related U.S. Application Data

(60) Provisional application No. 61/908,429, filed on Nov. 25, 2013.

(51) Int. Cl.
*G06F 9/45* (2006.01)
*G06F 9/455* (2006.01)

(52) U.S. Cl.
CPC ................. *G06F 9/45508* (2013.01)

(58) Field of Classification Search
CPC ............ G06F 9/45508; G06F 9/45504; G06F 9/45516
USPC ....................................................... 717/148
See application file for complete search history.

(56) References Cited

U.S. PATENT DOCUMENTS

| | | | |
|---|---|---|---|
| 6,643,803 B1 | 11/2003 | Swoboda et al. | |
| 2007/0067573 A1 | 3/2007 | Bruening et al. | |
| 2009/0055814 A1* | 2/2009 | Gallop et al. | 717/159 |
| 2011/0225213 A1 | 9/2011 | Mosier et al. | |

OTHER PUBLICATIONS

International Search Report & Written Opinion mailed Jun. 3, 2015 from related/corresponding International PCT Patent Application No. PCT/IB14/03009.

* cited by examiner

*Primary Examiner* — Anna Deng

(57) ABSTRACT

System and methods are provided for loop process suspension. One or more loop instructions associated with a loop process are loaded in a code cache. One or more branch instructions associated with a branch of the loop process in the code cache are determined. A suspension event is detected. The branch instructions are replaced with one or more jump instructions in the code cache upon the detection of the suspension event. If the jump instructions are executed in the code cache, the branch instructions in the code cache are restored, and the loop process is suspended. One or more suspension instructions associated with the suspension event are executed in an interpreter.

17 Claims, 9 Drawing Sheets

In template area of JIT code cache

Detail in Appendix C

RESTORE_BRANCH :

Save registers

Restore "B Entry" at T1

Test suspend flag

Set return address to T5 if not set

Restore registers

FIG. 5(A)

```
dvmCompiler_TEMPLATE_RESTORE_BRANCH
    stmfd   sp!, {r0-r3}
    mrs     r0, CPSR
    stmfd   sp!, {r0}
    stmfd   sp!, {lr}

/*********** restore insn *****************/
    ldr     r1, [lr, #11]   @ T3-T1, lr = (ret_addr + 1) in thumb
    sub     r0, lr, #5      @ &T3
    sub     r0, r0, r1      @ &T1
    ldr     r1, [lr, #7]    @ get B_enc
    ldr     r2, .LdvmWriteInst
    blx     r2
    /********* restore insn end *********/ ldmfd   sp!, {lr}
    ldrb    r0, [r6, #42]
    cmp     r0, #0
    addeq   lr, #4          @ if not suspend, continue loop, jump to &(b T1)

ldmfd   sp!, {r0}
    msr     cpsr, r0        @ restore cpsr ldmfd   sp!,{r0-r3}
    blx     lr
```

FIG. 5(B)

SYSTEMS AND METHODS FOR LOOP SUSPENSION IN JAVA PROGRAMMING

CROSS-REFERENCE TO RELATED APPLICATIONS

This disclosure claims priority to and benefit from U.S. Provisional Patent Application No. 61/908,429, filed on Nov. 25, 2013, the entirety of which is incorporated herein by reference.

FIELD

The technology described in this patent document relates generally to computer programming and more particularly to Java programming.

BACKGROUND

Java programs may be run on any machine on which a Java virtual machine (JVM) is executing. In a JVM (e.g., Dalvik), Java bytecodes may be executed using an interpreter at the start of a Java program. For example, before a Java program is executed, source codes of the program are broken down into Java bytecodes. At runtime, the Java interpreter of the JVM interprets the bytecodes. As an alternative, the JVM may choose not to interpret the bytecodes, but rather compile the bytecodes down into native codes. The JVM then causes the native codes to be executed directly by one or more processors. For example, frequently-used bytecodes are compiled into native codes to improve the running performance.

Just-in-time compilation (JIT), also known as dynamic translation, is compilation done during execution of a program or an application at run time, rather than prior to execution. Often JIT involves translation/compilation to native codes for Java programs. For example, native codes (e.g., trace) are put into a JIT code cache for execution. As shown in FIG. 1, a JIT code cache 100 includes commonly-used subroutines (e.g., TEMPLATE_CMP_LONG) and native codes (e.g., Trace-1).

SUMMARY

In accordance with the teachings described herein, system and methods are provided for loop process suspension. One or more loop instructions associated with a loop process are loaded in a code cache. One or more branch instructions associated with a branch of the loop process in the code cache are determined. A suspension event is detected. The branch instructions are replaced with one or more jump instructions in the code cache upon the detection of the suspension event. If the jump instructions are executed in the code cache, the branch instructions in the code cache are restored, and the loop process is suspended. One or more suspension instructions associated with the suspension event are executed in an interpreter.

In one embodiment, a system for loop process suspension includes: a code cache configured to store one or more loop instructions associated with a loop process; a monitor component configured to determine one or more branch instructions associated with a branch of the loop process in the code cache and replace the branch instructions with one or more jump instructions in the code cache upon detection of a suspension event; a running component configured to, in response the jump instructions being executed in the code cache, restore the branch instructions in the code cache and suspend the loop process; and an interpreter component configured to execute one or more suspension instructions associated with the suspension event.

In another embodiment, a system for loop process suspension includes: a code cache configured to store one or more loop instructions associated with a loop process and one or more data processors. The data processors are configured to: determine one or more branch instructions associated with a branch of the loop process in the code cache; detect a suspension event; replace the branch instructions with one or more jump instructions in the code cache upon the detection of the suspension event; execute the jump instructions in the code cache; restore the branch instructions in the code cache; suspend the loop process; and execute one or more suspension instructions in an interpreter, the suspension instructions being associated with the suspension event.

BRIEF DESCRIPTION OF THE DRAWINGS

FIG. 5(A) and FIG. 5(B) depict example diagrams showing codes for restoring branch instructions.

DETAILED DESCRIPTION

Usually, code execution in a JIT code cache is faster than in an interpreter. However, the interpreter can perform a large amount of complex processing logics and auxiliary operations which are unsuitable for the JIT code cache. Therefore, switching from the JIT code cache to the interpreter may be needed under certain circumstances. For example, a garbage collection (GC) process may be better executed using the interpreter. Specifically, a monitoring thread may set a suspend flag in the JVM to indicate a need of pausing execution of a current process. The interpreter detects the suspend flag periodically. If the flag is detected to be set, the current process (e.g., being executed in the JIT code cache) is suspended and the GC process is executed using the interpreter. Upon the completion of the GC process, a signal is transmitted to awaken the suspended process. When the current process corresponds to a loop process that often requires a long time to execute, it may be too late to wait until the entire loop process ends before executing the GC process. Thus, the loop process may need to be suspended from time to time for executing the GC process.

Figure 1:
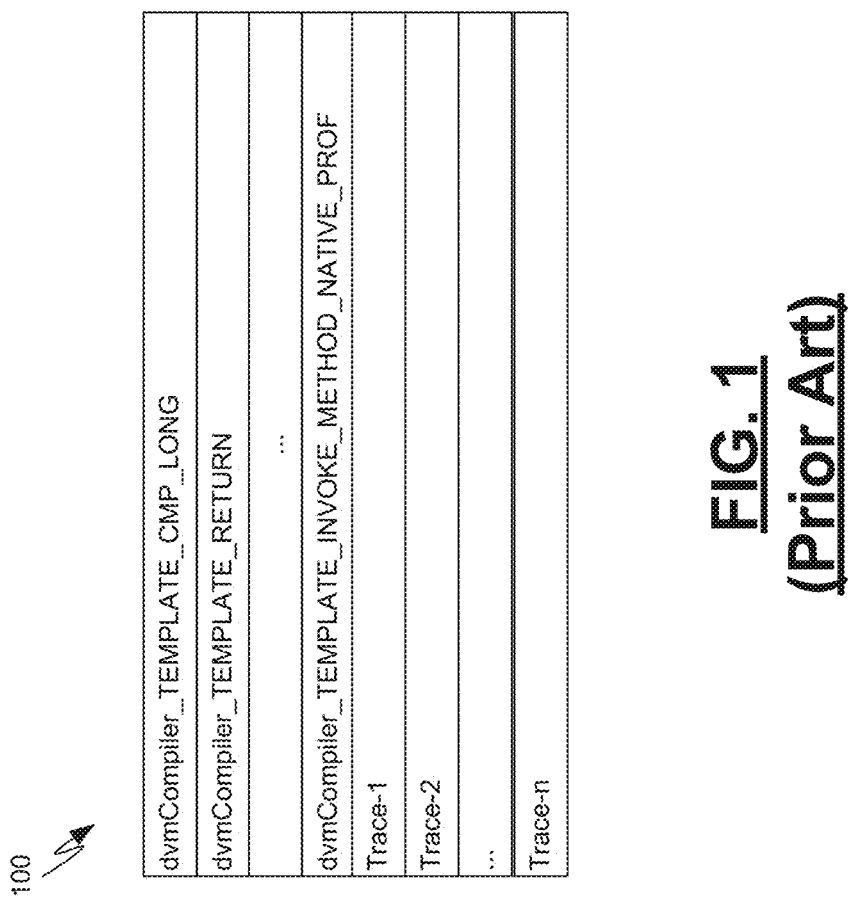
FIG. 1 depicts an example diagram showing a JIT code cache.
Figure 2:
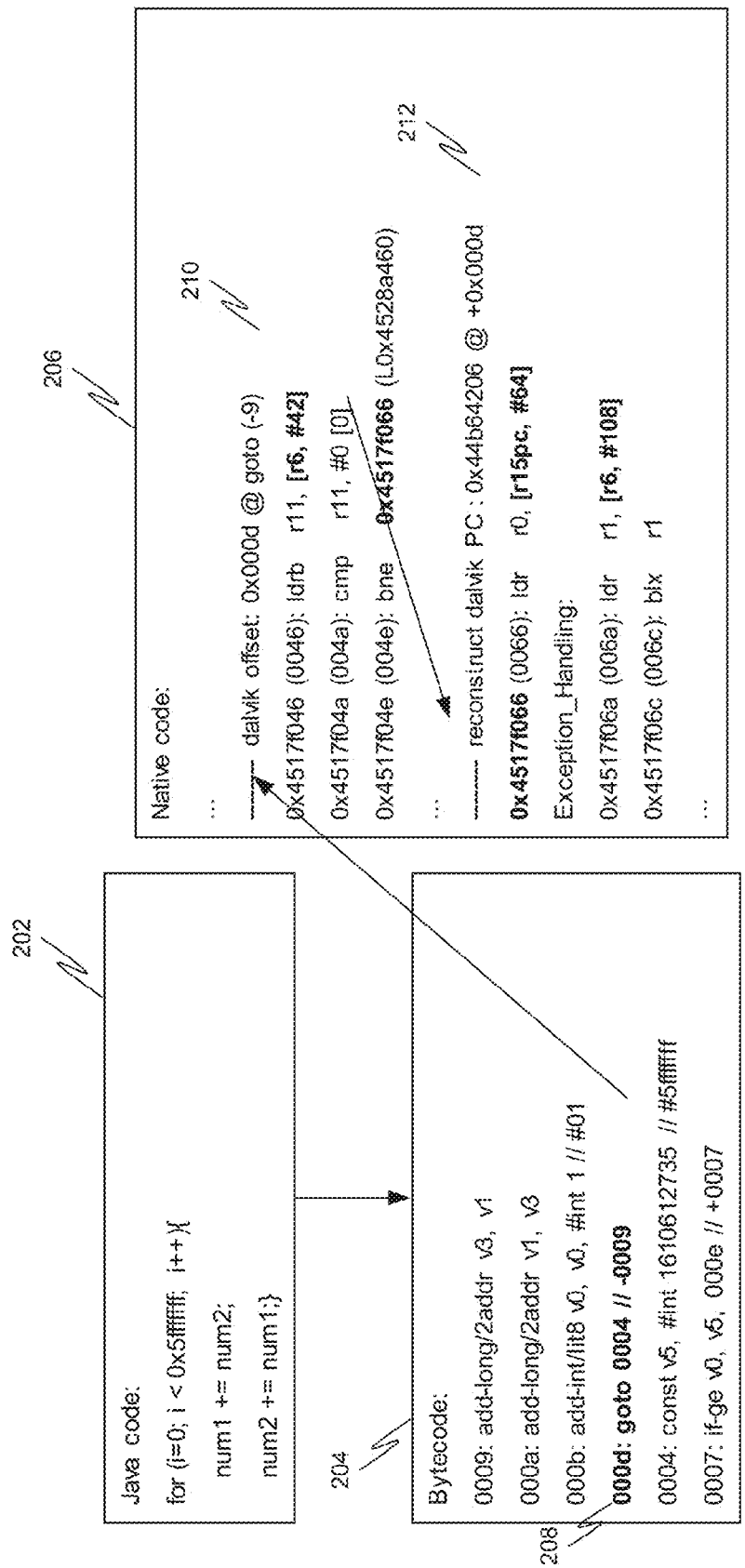
FIG. 2 depicts an example diagram showing loop process suspension.

FIG. 2 depicts an example diagram showing loop process suspension. As shown in FIG. 2, source codes 202 of a loop process (e.g., as part of a Java program) are broken down to bytecodes 204, and some bytecodes are compiled into native codes 206. A suspend flag is checked at a loop back edge in every iteration of the loop process. If the suspend flag is set, the loop process (e.g., executed in a JIT code cache) is suspended and an interpreter is entered for execution of certain suspension instructions (e.g., related to a GC process).

Specifically, a bytecode 208 (e.g., at "000d") corresponds to the loop back edge, and native codes 210 associated with the loop back edge are executed to check the suspend flag. As shown in FIG. 2, [r6, #42] corresponds to the address of the suspend flag. If the suspend flag is not zero, it indicates that the suspend flag is set. Native codes 212 (e.g., related to reconstructing Dalvik PC) are executed. The loop process executed in the JIT code cache is suspended. As shown in FIG. 2, [r6, #108] corresponds to the entry of the interpreter, and [r15pc, #64] corresponds to the setting of one or more parameters of the interpreter.

Figure 3:
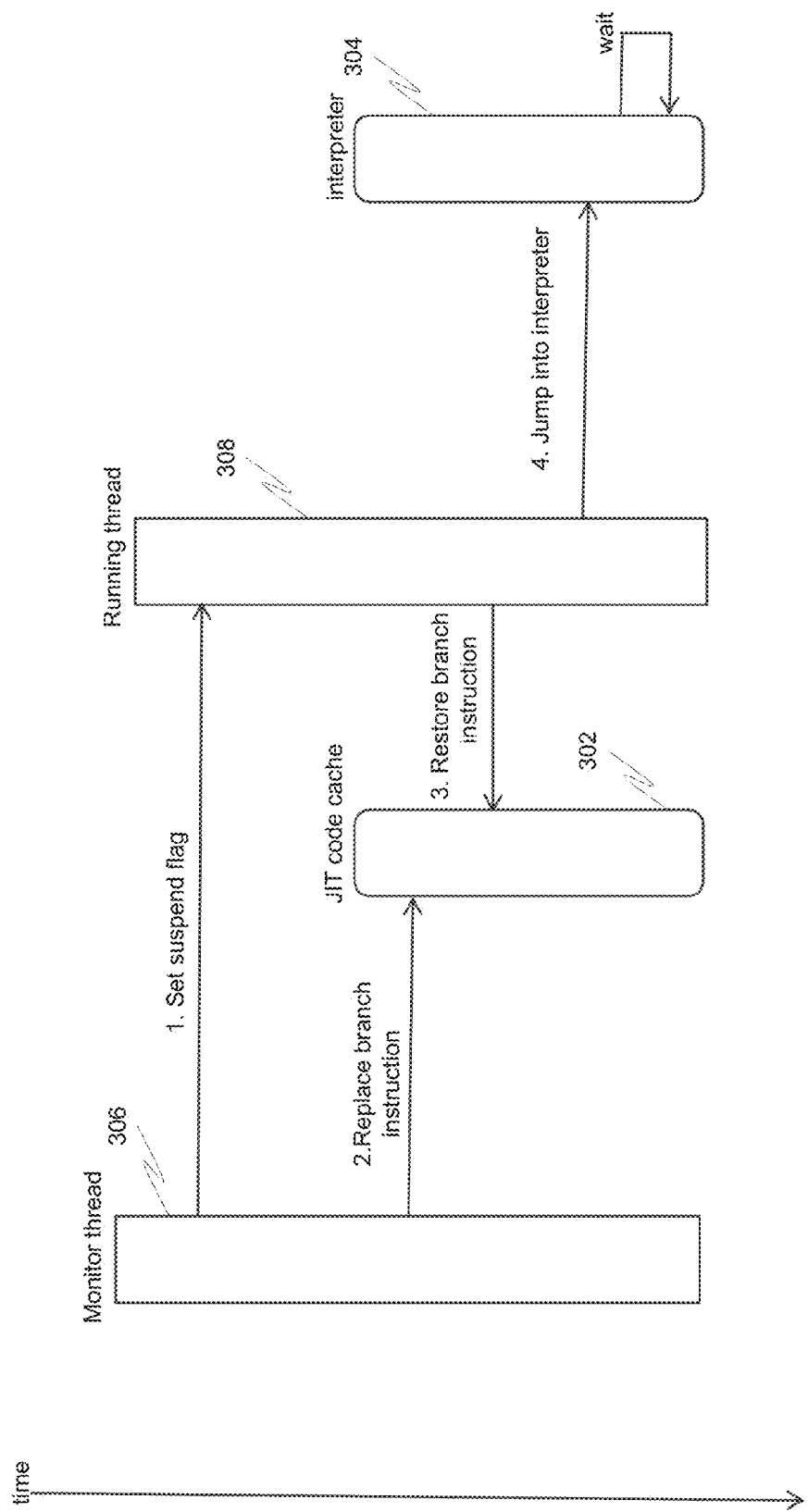
FIG. 3 depicts another example diagram showing loop process suspension.

FIG. 3 depicts another example diagram showing loop process suspension. As shown in FIG. 3, when a suspension event occurs, one or more branch instructions associated with a key path (e.g., a loop back edge) of the loop process in a JIT code cache 302 are replaced with instructions for jumping to an interpreter 304. Thus, the loop process is suspended in response to the suspension event and certain suspension instructions (e.g., related to a GC process) are executed in the interpreter 304.

Specifically, the monitor thread 306 sets a suspend flag in response to the suspension event (e.g., related to a GC process). In addition, the monitor thread 306 determines one or more branch instructions associated with the key path (e.g., a loop back edge) of the loop process and replaces the branch instructions with one or more jump instructions. When the execution of the instructions associated with the loop process in the JIT code cache 302 reaches the key path (e.g., a loop back edge), the running thread 308 restores the branch instructions in the JIT code cache 302 and jumps to the interpreter 304. For example, the loop process may be resumed immediately after the execution of the suspension instructions (e.g., related to a GC process) in the interpreter 304. In another example, the loop process may be resumed after a delay upon the execution of the suspension instructions (e.g., related to a GC process) in the interpreter 304.

In some embodiments, the running thread 308 tests the suspend flag when restoring the branch instructions in the JIT code cache 302. If the suspend flag is not set, it indicates that no suspension event occurs, and the running thread 308 causes the loop process to continue. If the suspend flag is set, the running thread 308 causes the exit of the JIT code cache 302 and the entry of the interpreter 304.

In certain embodiments, for a simple loop process that includes a single loop back edge, the monitor thread 306 selects one or more branch instructions that represent the single loop back edge to be replaced for loop process suspension. For a complex loop process that includes multiple loop back edges, the monitor thread 306 selects branch instructions that represent one or more loop back edges to be replaced for loop process suspension. The suspend flag is not checked in the loop process.

Figure 4A:
FIG. 4(A) and FIG. 4(B) depict example diagrams showing code layouts for loop process suspension.
Figure 4B:

FIG. 4(A) and FIG. 4(B) depict example diagrams showing code layouts for loop process suspension. As shown in FIG. 4(A), a branch instruction "T1" (e.g., "B Entry") represents a loop back edge of a loop process (e.g., being executed in a HT code cache) and points to a first instruction of the loop process. When a suspension event occurs, the branch instruction "T1" is selected and replaced with a jump instruction (e.g., "B T3"), as shown in FIG. 4(B). When the jump instruction at "T1" is executed, it jumps to the instruction "T3," instead of the first instruction of the loop process.

Specifically, upon the execution of the instruction "T3," the branch instruction (e.g., "B Entry") is restored at "T1." The instruction "T4" is executed to suspend the loop process and jump to an interpreter for executing suspension instructions associated with the suspension event. The instruction "T5" is executed to continue the loop process (e.g., after the execution of the suspension instructions in the interpreter).

As shown in FIG. 5(A), values stored in one or more registers are saved and the branch instruction "B Entry" is restored at "T1," so that next time the branch instruction is executed, it will jump to the first instruction of the loop process. A suspend flag is tested. If the suspend flag is not set, a return address to the instruction "T5" is provided for continuing the loop process. Then, the registers are restored. FIG. 5(B) depicts example native codes for the process shown in FIG. 5(A).

Figure 6:
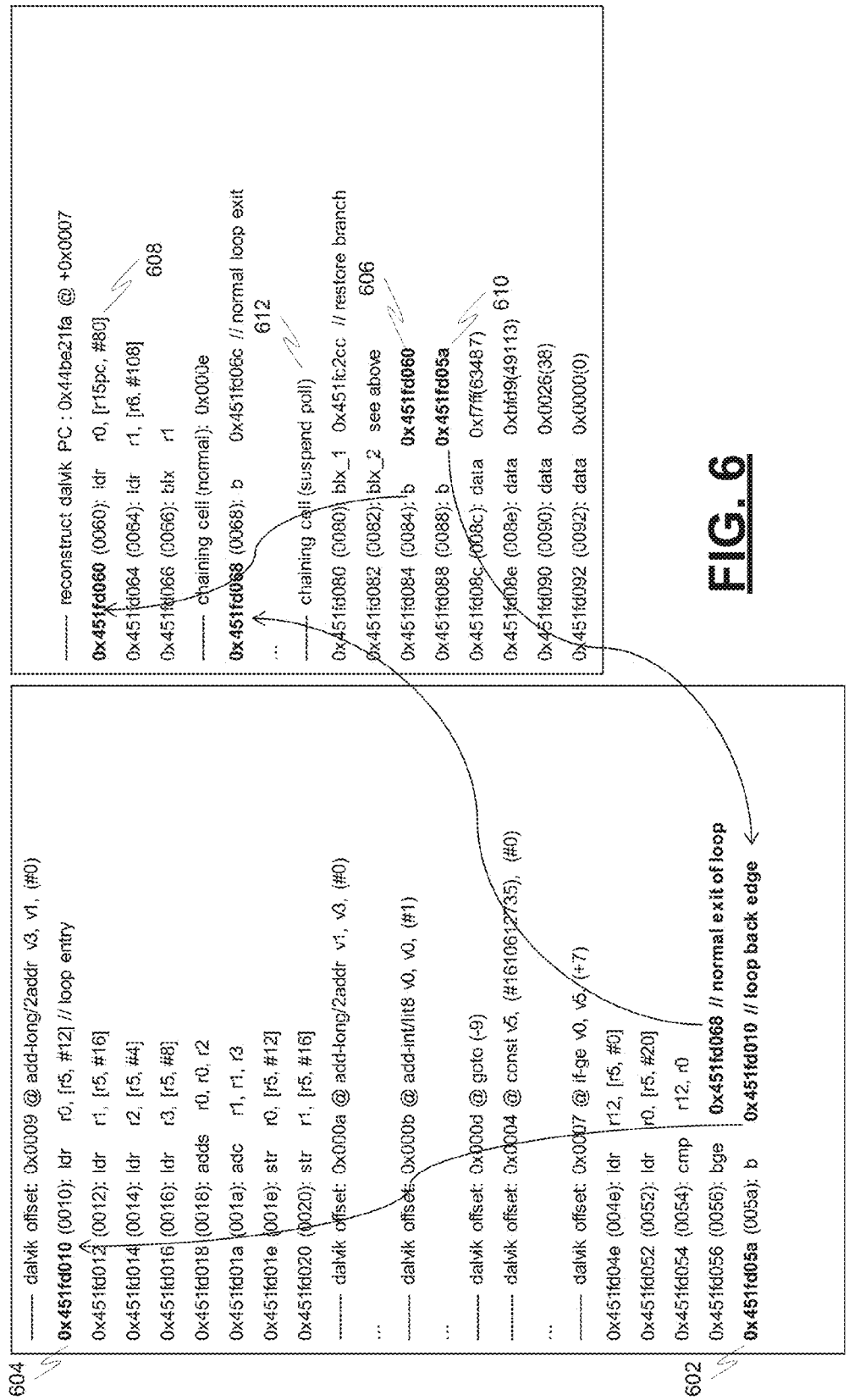
FIG. 6 depicts an example diagram showing certain native codes for loop process suspension.

FIG. 6 depicts an example diagram showing certain native codes for loop process suspension. As shown in FIG. 6, a branch instruction 602 represents a loop back edge of a loop process and points to a first instruction 604 of the loop process. When a suspension event occurs, the branch instruction 602 is selected and replaced with a jump instruction. When the jump instruction is executed, instructions in a "suspend poll" area 612 are executed. Specifically, the branch instruction 602 is restored. The instruction 606 is executed to suspend the loop process and jump to an interpreter for executing suspension instructions associated with the suspension event (e.g., starting with the instruction 608). After the execution of the suspension instructions in the interpreter, the instruction 610 is executed to continue the loop process.

Figure 7:
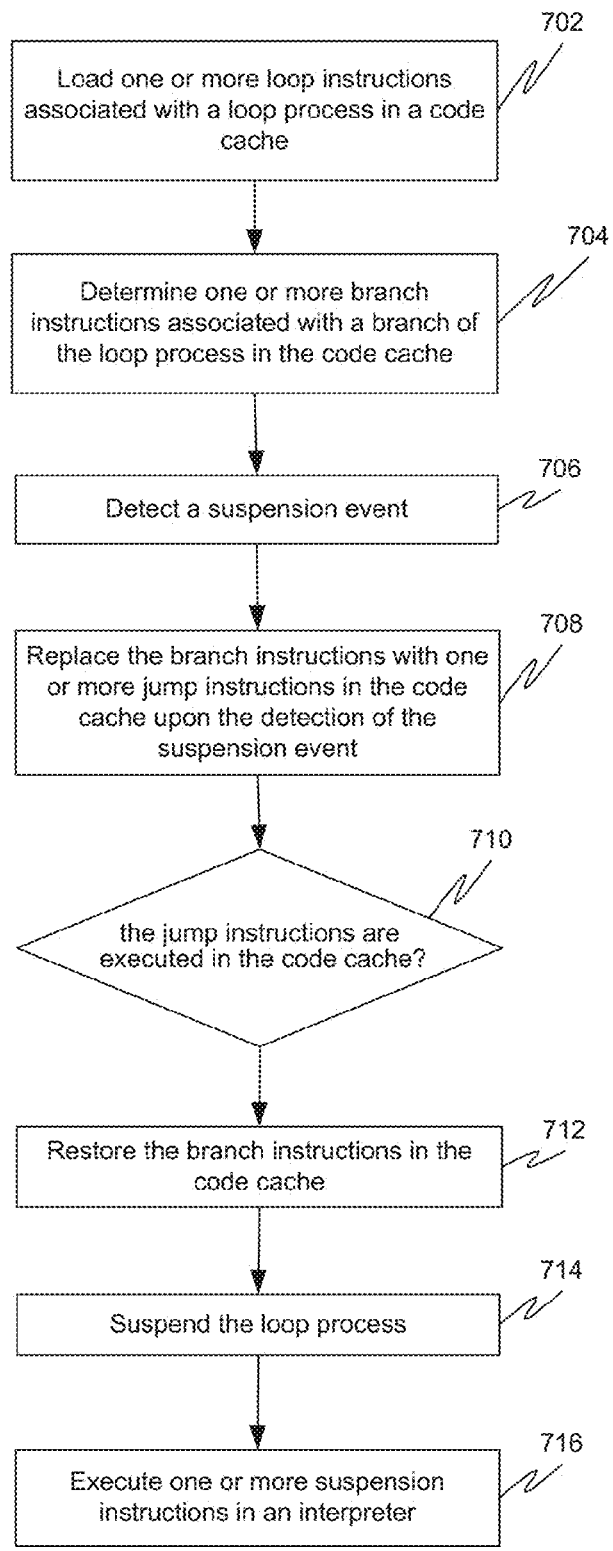
FIG. 7 depicts an example flow chart for loop process suspension.

FIG. 7 depicts an example flow chart for loop process suspension. At 702, one or more loop instructions associated with a loop process are loaded in a code cache. For example, the code cache is associated with a JIT compiler. At 704, one or more branch instructions associated with a branch of the loop process in the code cache are determined. For example, the branch corresponds to a loop back edge associated with the loop process. At 706, a suspension event is detected. In some embodiments, a suspend flag is set to indicate that the suspension event occurs. At 708, the branch instructions are replaced with one or more jump instructions in the code cache upon the detection of the suspension event. At 710, it is determined whether the jump instructions are executed in the code cache. If the jump instructions are executed in the code cache, the branch instructions in the code cache are restored, at 712. At 714, the loop process is suspended. At 716, one or more suspension instructions associated with the suspension event are executed in an interpreter. For example, the interpreter is associated with a Java virtual machine (e.g., Dalvik).

This written description uses examples to disclose the invention, include the best mode, and also to enable a person skilled in the art to make and use the invention. The patentable scope of the invention may include other examples that occur to those skilled in the art. Other implementations may also be used, however, such as firmware or appropriately designed hardware configured to carry out the methods and systems described herein. For example, the systems and methods described herein may be implemented in an independent processing engine, as a co-processor, or as a hardware accelerator. In yet another example, the systems and methods described herein may be provided on many different types of computer-readable media including computer storage mechanisms (e.g., CD-ROM, diskette, RAM, flash memory, computer's hard drive, etc.) that contain instructions (e.g., software) for use in execution by one or more processors to perform the methods' operations and implement the systems described herein.

What is claimed is:
1. A method comprising:
   loading loop instructions, associated with a loop process, into a code cache;
   identifying a branch instruction of the loop process in the code cache;
   detecting a suspension event;

in response to detecting the suspension event, replacing the branch instruction in the code cache with a jump instruction for jumping to an interpreter configured to execute one or more suspension instructions associated with the suspension event;

continuing program execution until the jump instruction is reached;

when the jump instruction is reached, executing the jump instruction by jumping to the interpreter;

in response to the executing of the jump instruction, restoring the branch instructions in the code cache, and executing, by the interpreter, the one or more suspension instructions, wherein the restoring of the branch instruction in the code cache is performed before completion of the executing of the one or more suspension instructions; and returning to execution of the loop process after the executing of the one or more suspension instructions.

2. The method of claim 1, wherein the branch corresponds to a loop back edge associated with the loop process.

3. The method of claim 1, further comprising:
setting a suspend flag.

4. The method of claim 3, wherein the suspend flag is not tested during the loop process.

5. The method of claim 1, further comprising;
in response to the branch instructions being restored in the code cache, testing a suspend flag; and
in response to the suspend flag not being set, continuing the loop process.

6. The method of claim 1, wherein the code cache is associated with a Just-in-time (JIT) compiler.

7. The method of claim 1, wherein the interpreter is associated with a Java virtual machine.

8. A system comprising:
a non-transitory computer-readable medium storing a code cache configured to store one or more loop instructions associated with a loop process;
a data processor configured to execute instructions to implement:
  a monitor component configured to identify a branch instruction of the loop process in the code cache,
  detect a suspension event; and
  in response to detecting the suspension event, replace the branch instructions in the code cache with a jump instruction for jumping to an interpreter configured to execute one or more suspension instructions associated with the suspension event;
  a running component configured to continue program execution until the jump instruction is reached;
  when the jump instruction is reached, execute the jump instruction by jumping to the interpreter; and
  in response to the executing of the jump instruction, restore the branch instructions in the code cache, and
  the interpreter configured to execute the one or more suspension instructions, wherein restoring the branch instruction in the code cache is performed before completion of the executing of the one or more suspension instructions; and
a processing engine configured to return to execution of the loop process after the executing of the one or more suspension instructions.

9. The system of claim 8, wherein the branch corresponds to a loop back edge associated with the loop process.

10. The system of claim 8, wherein the monitor component is further configured to set a suspend flag.

11. The system of claim 10, wherein the running component is configured not to test the suspend flag during the loop process.

12. The system of claim 8, wherein the running component is further configured to:
upon the execution of the branch instructions, test a suspend flag; and in response to the suspend flag not being set, continue the loop process.

13. The system of claim 8, wherein the code cache is associated with a Just-in-time (JIT) compiler.

14. The system of claim 8, wherein the interpreter is associated with a Java virtual machine.

15. A system comprising:
a code cache configured to store loop instructions associated with a loop process; and
one or more data processors configured to:
  identify a branch instruction of the loop process in the code cache;
  detect a suspension event;
  in response to detecting the suspension event, replace the branch instruction with a jump instruction for jumping to an interpreter configured to execute one or more suspension instructions associated with the suspension event;
  continue program execution until the jump instruction is reached;
  when the jump instruction is reached, execute the jump instruction in the code cache;
  in response to the executing of the jump instruction, restore the branch instructions in the code cache, and
  execute the one or more suspension instructions in an interpreter, wherein restoring the branch instruction in the code cache is performed before completion of the executing of the one or more suspension instructions; and
  return to execution of the loop process after the executing of the one or more suspension instructions.

16. The system of claim 15, wherein the branch corresponds to a loop back edge associated with the loop process.

17. The system of claim 15, wherein the one or more data processors are further configured to:
upon the restoration of the branch instructions in the code cache, test a suspend flag; and
in response to the suspend flag not being set, continue the loop process.

* * * * *